Oct. 5, 1965 J. S. HOCHHEISER 3,210,595

INFINITE IMPEDANCE AMPLIFIER TUBE OF CATHODE RAY TUBE TYPE

Filed Jan. 8, 1962

JEROME S. HOCHHEISER
INVENTOR.

BY Norman L. Chalfin
Att.

3,210,595
INFINITE IMPEDANCE AMPLIFIER TUBE OF CATHODE RAY TUBE TYPE
Jerome S. Hochheiser, 8847 Oakdale Ave., Northridge, Calif.
Filed Jan. 8, 1962, Ser. No. 164,878
4 Claims. (Cl. 315—18)

This invention relates to electron tube devices and more particularly to a novel high-impedance input coupling device for electrical impulses.

In the bio-electronic fields such as electroencephalography and the like, electric currents and electric potentials are encountered which have extremely low levels. These are generated in high-impedance biological sources which, when coupled to amplifying circuits utilizing vacuum tubes of known configurations, are loaded down to such a degree, the resulting amplification necessary to recover the loss is so great that the signal-to-noise ratio obtainable is extremely unfavorable.

Conventional high-gain vacuum tubes employing existing circuit configurations present impedances to the input signals on the order of 10 megohms. In such vacuum tubes, however, the minutest traces of gas—even in tubes of the finest manufacture—result in the generation of potentials due to ion flow into the vacuum tube grid. Such potentials develop noise voltages which in themselves stimulate the nerve tissues yielding potentials which affect detrimentally the biolectric potentials being measured.

This invention contemplates means by which the problems inherent in even the best of the conventional techniques can be overcome. By the novel vacuum-tube structure of this invention an extremely high-impedance coupling device is achieved which is most particularly useful in the intercoupling of high-impedance low-level sources of potentials with high gain amplifiers without appreciable loading of these high-impedance low-level sources. The vacuum tube device is conceived in this invention may be used in the fields of electroencephalography, electrocardiography, electromyography and in the electro-chemical fields where minute currents are involved such as may be encountered in the measurement of pH factors and various ionization measurement techniques associated with gas and fluid technologies, also in the fields of wide band amplifiers and high gain RF amplifiers.

Accordingly, it is an object of this invention to provide a device which presents an input impedance in excess of 1000 megohms to sources to which it is coupled.

It is another object of this invention to provide an input coupling device for electronic circuits with truly undirectional characteristics in which no potential is generated in the coupling device which can be returned to the source, nor can any potentials which may be generated in the amplifier be applied back to the signal source.

It is still another object of the invention to provide a coupling device capable of operation without variation in frequency response from D.-C. through the very high frequencies (VHF).

It is a further object of the invention to provide an electron tube coupling device employing cathode ray tube principles to provide means for frequency multiplication without dissipating energy from the source.

It is an even further object of this invention to provide a cathode-ray tube device incorporating a novel resistance element configuration therein whereby signals from a high impedance input source may be coupled to high gain amplifiers without such intercoupling between the source and the amplifier as to be deleterious to the source.

These and other objects will become more clear from the specification which follows describing a preferred embodiment of the invention but not limited thereto, and the appended claims when taken together with the drawings in which:

Figures 1, 4:
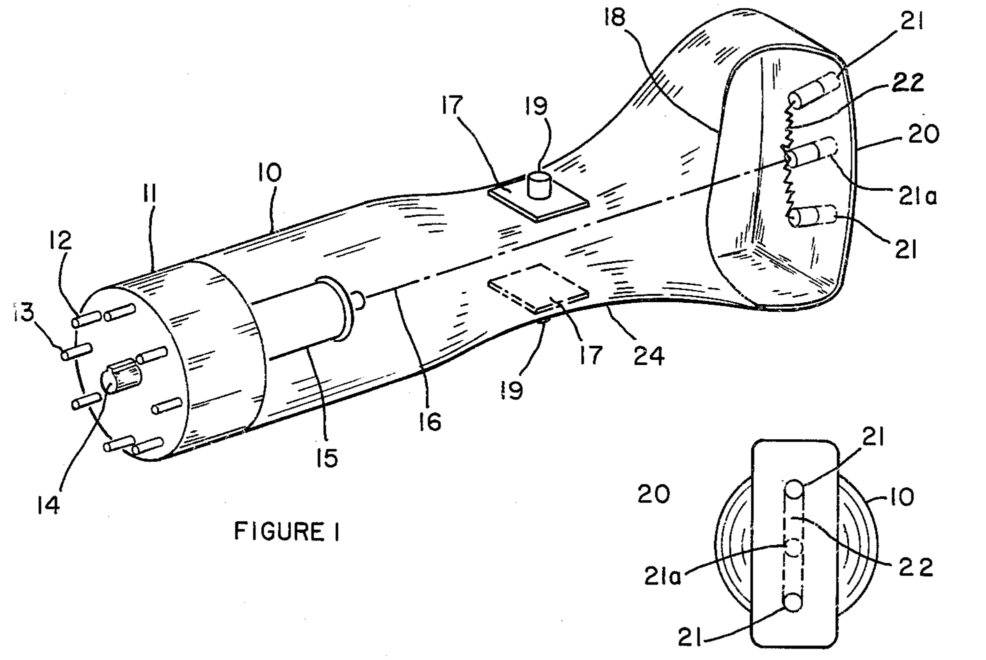
FIGURE 1 is partially broken away perspective view of a high impedance coupling device according to the invention.
FIGURE 4 is a front view of the device shown in FIGURE 1 to illustrate the appearance of the face thereof.
Figure 2:
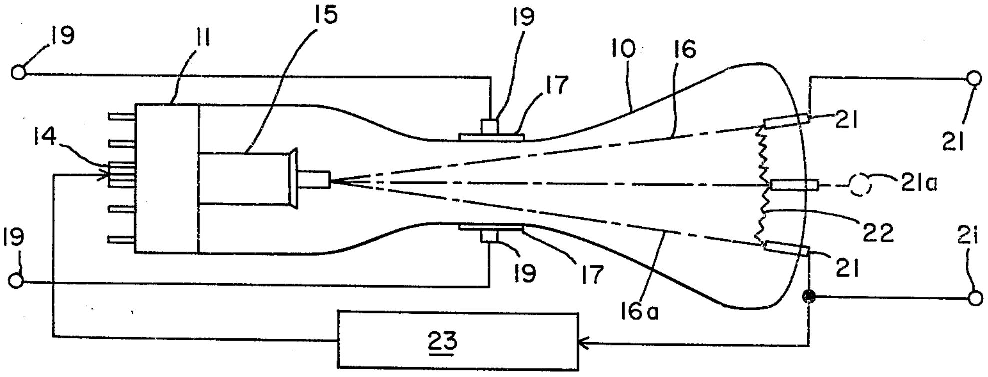
FIGURE 2 is a schematic circuit representation of the principle of operation of a typical circuit in which the device of this invention is employed.
Figure 3:
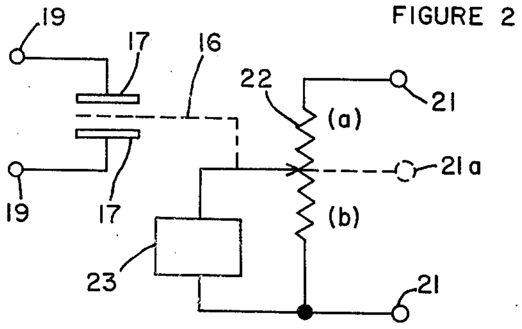
FIGURE 3 is a schematic circuit showing the theoretical basis for the operation of the device according to this invention.

Referring now to FIGURES 1, 2, and 3, there is shown an exemplary implementation of a device embodying the principles of this invention. An evacuated glass envelope 10 having at one end thereof a terminal base 11 with terminal connection pins such as 12 and 13 and a centering key 14 is shown in which the central area at 24 is constricted and the opposite or face end 20 has a generally rectangular configuration as shown in FIGURE 4. The constriction 24 is relatively flat and in a plane perpendicular to the vertical axis of face 20.

Within envelope 10 an electron gun 15 is provided, the elements of which are conventional, and which are connected in the known manner to the terminal pins such as 12 and 13 in base 11. Electron gun 15 generates an electron beam 16 within envelope 10. When powered as shown schematically by a suitable power as shown schematically by a suitable power source 23 which passes between a pair of deflection plates 17 imbedded in the glass envelope on either face of constriction 24. The flat surface of constriction 24 in which deflection plates 17 are imbedded is normal to the longest dimension of face 20 of tube 10 so that the potentials applied to plates 17 at terminals 19 deflect the beam in the vertical plane perpendicular to that of the plates and corresponding to the axis of the long dimension of face 20.

In face 20 electodes 21 and 21*a* are embedded. Electrode 21*a* is positioned centrally in line between electrodes 21 at the extremes. Electrode 21*a* may be eliminated in one form of the invention as further defined below. Between electrode terminals 21 a resistance element 22 is connected. Resistance element 22 which is formed of a resistive coating is deposited on the inner surface of face 20 on top of a fluorescent coating, as hereinafter described, if such a coating should be used. If no fluorescent coating is used then the resistive material 22 is deposited directly on the inner surface of face 20 of envelope 10. The material employed for deposting resistance 22 on the inner surface of 20 may be carbon or any other material which exhibits a characteristic resistance to the flow of electric current.

For a description of the operation of a system in which the invention is used reference is now made to FIGURE 2. The evacuated cathode-ray type of tube 10 as hereinabove described includes an electron gun 15 of conventional configuration and a target surface in face 20 which is formed of resistance material at 22. Between electron gun 15 and target 22 a regulated constant current source of supply 23 is connected. While one terminal of supply 23 is connected to a base 11 in the diagram of FIGURE 2, this is only a schematic representation of the fact that whatever potentials derived from supply 23 are required for the various elements of the conventional electron gun 15, these are understood to be connected to the appropriate terminals such as 12 and 13 of base 11 (as indicated in FIGURE 1). The terminals such as 12 and 13 connect to the respective elements of the electron gun 15 in the well-known fashion of such devices. The other terminal of supply 23 represents the high potential end of supply 23 connected between the cathode of electron gun 15 and target 22. The high potential is connected to target 22 at one end of resistive surface 21 at a point corresponding to the lower of the two output terminal connections 21. When properly connected to supply 23 electron gun 15 emits an electron beam 16 towards the face 20 of tube 10 which impinges under normal or ambient conditions on the center of resistance element 22. This is the condition which would normally prevail in the absence of a potential being applied between electrodes 17 from input terminals 19.

A source of input signals which may be a bioelectric potential source in animal or human tissue, or which may be an electrochemical source such as a fluid or chemical solid exihibiting minute electrical signals or even substantial amplitudes of signal at relatively small current levels. In short, any source which would require an extremely high impedance load device connected to it for utilization of the signal without dissipation thereof may be connected at terminals 19 so that the signals of said source may be applied to deflection electrodes 17 of the tube 10.

The physical separation of, and dimensions of, electrodes 17 are such that even a small electrostatic field developed between them due to signals applied at terminals 19 will impart a substantial deflection to the electron beam 16 passing between deflection electrodes 17 on its path towards resistive element 22 on face 20.

Electrodes 17 are so imbedded in the glass at 24 that there is only a film of glass between the juxtaposed surfaces of deflection plates 17 and the interior of evacuated glass envelope 10. Since glass is transparent to an electrostatic field but opaque to ion conduction, the location of the deflection electrodes 17 in the glass wall in this way eliminates the problems which may arise from ionization of gases due to metals in a vacuum chamber. Therefore ionization potentials, if any should be developed within the vacuum chamber, can not be conducted back to the signal source.

The input impedance of the deflection electrodes 17 then becomes a function of the conductivity of the glass, which is extremely high, and the capacitance between electrodes 17. If the electrodes 17 are of small dimensions then the capacitance can be kept quite small. If quartz glass is used for envelope 10, an even higher impedance is possible.

By an appropriate physical configuration of the electrodes which may be determined by calculation and experimental means, a flat response can be obtained over a range from D.-C. through VHF. Also plate dimensions and electrode gap dimensions may be selected for particular deflections sensitivities as required for different levels of input potentials.

The gap dimensions may be selected for use with high voltage low current input signals in this way eliminating need for dissipative voltage dividers.

An output signal $E_o$ is developed in the operation of this invention as a function of input signals $E_{in}$ applied between electrodes 17. The electrostatic field established by a signal applied to electrodes 17 at terminals 19 deflects the electron beam 16 generated by electron gun 15 and directed towards target 22, a deposited carbon resistance element $R_c$. Deflection of electron beam 16 varies the point (in the vertical plane) at which the beam enters the resistance element 22. The variation of the position of the beam on element 22 occurs directly as the input potential applied at terminals 19 is varied. Movement of beam 16 on resistance element 22 varies the resistance length between beam 16 and the power supply return. The portion above beam 16 is identified as $R_1$ and the portion between beam 16 and the power supply 23 is identified as $R_2$.

Since the electron beam 16 is emitted from a constant current source, the voltage drop across the section $R_2$ of resistance element 22 between beam 16 and power supply

23 will be, according to Ohm's law, a function of the resistance change in $R_2$:

$$E_0(\text{output voltage}) = I(\text{beam current}) \times R_2$$

The value of resistance $R_c$ in the resistance coating 22 is expressed in ohms-per-inch:

$$R_c = \frac{R_1 + R_2}{L}$$

Where $R_1$ is the portion of resistance above beam 16 to terminals 21 and $R_2$ is the resistance between beam 16 and the terminals 21 at power supply 23, $R_1+R_2$ is thus the total resistance and L is the length in inches of resistance unit 22.

As above indicated:

$$E_o = IR_2 \qquad (1)$$

That is, output voltage equals beam current times the resistance in the portion $R_2$ of resistance element 22. $E_o$ is the output of the system. The relation of $R_2$ to the total resistance can be defined as:

$$\frac{R_2}{R_1 + R_2} = \frac{D_s E_{in}}{L} \qquad (2)$$

Where $D_s$ is the deflection sensitivity of the electrodes 17 in inches-per-volt-applied and L the total length in inches of resistance 22. $E_{in}$ is the input signal.

$$R_2 = \frac{R_1 + R_2}{L} D_s E_{in} \qquad (3)$$

but since $$R_c = \frac{R_1 + R_2}{L}$$

Then $R_2 = R_c D_s E_{in}$ and $$K = \frac{E_o}{E_{in}} = I R_c D_s$$

where K is the transfer function constant of a tube according to this invention, the constant K is a function of deflection sensitivity ($D_s$), the current (I) in the electron beam and the value of the resistance coating ($R_c$) in ohms per inch.

As an example of typical values which can be encountered in the implementation of this invention:

$I = 1 \times 10^{-3}$ amps
$R_c = 10^7$ ohms per inch
$D_s = 0.1$ inch per volt and K therefore will be $$K = 1 \times 10^{-3} \times 10^7 \times 10^{-1} \text{ or}$$
$$K = 1000$$

It may be seen from the above that an electron beam 16 in a cathode ray tube structure 10 built in accordance with this invention and shown in FIGURE 1 may be employed to inject a current into a resistive element 22 at controllably varying positions along the length of the resistive element. When central terminal 21*a* is included and the beam traverses the area from the upper terminal 21 to cross central terminal 21*a* and on to lower terminal 21, the resultant output will be a signal having an alternating frequency twice that of the rate of oscillation of the beam due to an A.-C. input signal applied to electrodes 17 through terminals 19.

A conventional electron gun 15 and deflecting plates 17 may be used in accordance with this invention to match very high impedances or amplify minute electrical currents where other forms of amplifiers would not be suitable. Frequency doubling can be accomplished as above described.

Additional elements in the electron gun 15 for beam 16 positioning prior to arrival of the beam 16 at the deflection plates 17 may be necessary in some configuration of tubes used according to the invention.

Furthermore, it can be seen that in accordance with the invention hereinabove described a controlling element outside the vacuum chamber may be used in an amplifying device to avoid reverse coupling by eliminating ionization factors due to de-gassing of tube elements within the vacuum chamber.

As has been shown in the computations above an amplification factor (mu) is achieved in excess of values heretofore attainable with conventional vacuum tubes. As an example the parameters of a tube according to this invention with an amplification factor (mu) of 1000 have been computed.

What is claimed as new is:

1. A high-impedance vacuum-tube signal amplifying device comprising:

an evacuated glass envelope having a central flat constriction therein, a terminal base at one end of said envelope, and a target face at the opposite end thereof;

a pair of signal receiving deflection plates embedded in opposite sides of said constriction, the inner juxtaposed faces of said plates being covered with a thin film of glass, said plates having external terminals for connection to a source of varying input signals;

an electron gun within said envelope positioned between said constriction and said terminal base and having connections to said base, said electron gun being equipped for generating an electron beam which is directed at said target face between said plates when appropriate external sources of potential are connected to the terminals of said base; and a resistance coating deposited on the inner surface of said target face, and having external terminal connections thereto extending through said face; whereupon when varying signals from said source are applied to said signal receiving deflection plates said electron beam is deflected by said variations to impinge upon various parts of said resistance coating to develop therein a varying potential drop between the point at which said electron beam impinges on said resistance element and said external terminal connections, said varying potential drop being a substantially amplified counterpart of said varying input signals.

2. A high-gain, high-impedance vacuum-tube signal amplifying device comprising:

an evacuated glass envelope having a central flat constriction therein, a terminal base at one end of said envelope, and a target face at the opposite end thereof;

a pair of signal receiving deflection plates embedded in opposite sides of said constriction, the inner juxtaposed faces of said plates being covered with a thin film of glass, said plates having external terminals for connection to source of input signals;

an electron gun within said envelope positioned between said constriction and said terminal base and having connections to said base, said electron gun being equipped for generating an electron beam which is directed at said target-face through said constriction;

a resistance coating deposited on the inner surface of said target face, and having external terminal connections thereto extending through said face; and a potential source connected between said terminals of said base and one end of said resistance coating whereupon when input signals are applied to said signal receiving deflection plates said electron beam is deflected by the variations of said input signals to impinge upon various parts of said resistance coating to develop therein a potential drop between the point at which said electron beam impinges on said resistance element and said external terminal connections to develop in said element substantially amplified counterparts of said input signals.

3. A high-impedance vacuum-tube signal amplifying device comprising:

an evacuated envelope having a central flat constriction therein, terminal means and target face means at opposite ends thereof;

a pair of deflection plates embedded in said constriction, and having external terminals for connection to a source of input signals;

an electron gun within said envelope positioned between said constriction and said terminal means for generating an electron beam directed at said target-face means; and a resistance coating deposited on the inner surface of said target face means, and having external terminal connections thereto extending through said face;

whereby input signals applied to said deflection plates deflect said electron beam to impinge upon various parts of said resistance coating to develop at said external terminals thereof a potential drop, the variations of said drop being a substantially amplified counterpart of said input signals.

4. A high-impedance vacuum-tube signal amplifying device comprising:

an evacuated glass envelope having a central flat constriction therein, a terminal base at one end of said envelope, and a target face at the opposite end thereof;

a pair of deflection plates embedded in opposite sides of said constriction, the inner juxtaposed faces of said plates being covered with a thin film of glass, said plates having external terminals for connection to source of varying signals;

an electron beam generator within said envelope positioned between said constriction and said terminal base and having connections to said base; and an impedance deposited on the inner surface of said target face, whereupon when varying signals are applied to said deflection plates the electron beam generated by said generator is deflected by said variations to impinge upon various parts of said impedance to develope thereon a varying potential drop corresponding to said signals.

References Cited by the Examiner

UNITED STATES PATENTS

| | | | |
|---|---|---|---|
| 2,477,547 | 7/49 | Riggen | 313—89 X |
| 2,507,590 | 5/50 | Clark | 313—92 X |
| 2,588,292 | 3/52 | Rittner et al. | 313—89 |

FOREIGN PATENTS

| | | |
|---|---|---|
| 680,825 | 9/39 | Germany. |

GEORGE N. WESTBY, *Primary Examiner.*

RALPH G. NILSON, *Examiner.*